United States Patent
Vazquez et al.

(10) Patent No.: US 7,296,583 B2
(45) Date of Patent: Nov. 20, 2007

(54) PRETREATMENT SPRAY CLEAN TANK CONFIGURATION

(75) Inventors: Eduardo E. Vazquez, Novi, MI (US);
Clive Snell, Canton, MI (US); David J. Cole, Canton, MI (US)

(73) Assignee: Durr Systems, Inc., Plymouth, MI (US)

(*) Notice: Subject to any disclaimer, the term of this patent is extended or adjusted under 35 U.S.C. 154(b) by 644 days.

(21) Appl. No.: 10/324,580

(22) Filed: Dec. 19, 2002

(65) Prior Publication Data
US 2003/0155002 A1 Aug. 21, 2003

Related U.S. Application Data

(60) Provisional application No. 60/342,954, filed on Dec. 19, 2001.

(51) Int. Cl.
*B08B 3/02* (2006.01)
(52) U.S. Cl. .............. 134/64 R; 134/135; 134/182
(58) Field of Classification Search ............. 134/64 R, 134/122 R, 131, 135, 182, 183
See application file for complete search history.

(56) References Cited

U.S. PATENT DOCUMENTS

| | | | | |
|---|---|---|---|---|
| 2,199,747 A | * | 5/1940 | Long et al. ............ | 134/9 |
| 2,440,134 A | * | 4/1948 | Zademach et al. ...... | 134/148 |
| 2,561,631 A | * | 7/1951 | Negri ................ | 134/57 R |
| 3,103,936 A | * | 9/1963 | Nolte ................ | 134/72 |
| 3,291,144 A | * | 12/1966 | Diamond ............. | 134/104.1 |
| 3,292,194 A | * | 12/1966 | Randall .............. | 15/77 |
| 3,516,230 A | * | 6/1970 | Saubesty ............. | 96/238 |
| 3,942,197 A | * | 3/1976 | Sudmann et al. ...... | 4/609 |
| 4,170,240 A | * | 10/1979 | Gentry .............. | 134/57 R |
| 5,150,727 A | * | 9/1992 | D'Amato ............ | 134/104.2 |
| 5,185,041 A | * | 2/1993 | Anderson et al. ...... | 134/25.1 |
| 5,413,131 A | * | 5/1995 | Medlock ............. | 134/104.4 |
| 5,549,759 A | * | 8/1996 | Lithander ............ | 134/22.11 |
| 5,904,169 A | * | 5/1999 | Yoshitani ............ | 137/2 |

* cited by examiner

Primary Examiner—Frankie L. Stinson
(74) Attorney, Agent, or Firm—Howard & Howard Attorneys, P.C.

(57) ABSTRACT

A spray clean stage of a pretreatment system for treating a product surface having contaminants includes a tank for holding a cleaning solution to clean the product surface. A solution applicator is in fluid communication with the tank through an applicator inlet. The solution applicator is oriented to spray the solution onto the product surface thereby removing the contaminants from the product surface. A partition at least partially covers the tank and receives runoff of the solution from the product surface being sprayed with the solution. The partition is oriented to direct the runoff of solution from the product surface into the tank at a location spaced from the applicator inlet to distance the contaminants removed from the product surface from the applicator inlet.

10 Claims, 4 Drawing Sheets

PRETREATMENT SPRAY CLEAN TANK CONFIGURATION

This application claims priority to Provisional Application U.S. Ser. No. 60/342,954, filed Dec. 19, 2001.

BACKGROUND OF THE INVENTION

The subject invention relates to cleaning and pretreatment of product surfaces for preparing the product surface for a coating application. More specifically, the subject invention relates to cleaning a product surface with a cleaning agent, phosphate, or other conversion coating for paint application.

Pretreatment refers to the treatment of plastic or metallic surfaces such as automobile parts and preparation for subsequent application of a coating to the part. For example, a metallic surface for an automobile body is prepared for subsequent application of electrodeposition paint via an electrodeposition paint tank. Plastic components have also been known to have a surface treatment in a pretreatment system prior to the application of a primer or decorative coating.

A typical metallic vehicle body arrives at a pretreatment apparatus covered with metal forming oils, grinding dust, and other environmental contaminants. These contaminants must be removed to apply a defect-free phosphate coating to prepare the metallic surface to receive corrosion resistance and decorative coatings. Pretreatment includes a series of surface cleaning stages followed by phosphating, or the application of a conversion coating. Zinc phosphate is the principal conversion coating used in the automobile industry today, although iron phosphate is widely used in other applications. The pretreatment process includes a series of steps designed to remove contaminants from the metal surface, convert the surface to an inorganic crystalline coating, and seal the crystalline structure.

One example of an immersion zinc phosphate system includes nine stages: Spray cleaner, immersion cleaner, spray rinse, immersion conditioner rinse, immersion zinc phosphate, immersion rinse, immersion chromic acid rinse, immersion recirculated deionized water rinse, and a spray virgin deionized water rinse. The first two stages, the spray cleaner and immersion cleaner stages, clean the surface of contaminants to prepare the surface to form a tight, adherent, fine grained zinc phosphate coating. Absent a clean surface, the first layer of paint, commonly referred to as an electrodeposition coating, will not adhere properly resulting in paint defects projecting through the top coat or premature corrosion of the metallic surface. The third stage, the spray rinse stage, follows cleaning and rinses the cleaning solution from the metallic surface. Failure to rinse the cleaning solution results in contamination of subsequent chemical treatment stages. The immersion conditioner rinse stage, stage four, increases the nucleation sites on the metallic surface, thereby reducing the amount of zinc phosphate required to coat the surface and improve conversion coating uniformity. The immersion zinc phosphate stage, stage five, applies phosphate crystals to the metal surface, giving the surface corrosion-inhibiting properties and providing an improved base for paint application. Stage six, the immersion rinse, rids the surface of compounds from the zinc phosphate stage that could contaminate stage seven, the immersion chromic rinse stage. The chromic acid rinse removes remaining water soluble compounds from the surface to maximize corrosion protection. While the chromic acid rinse stage is not essential to the phosphating process, corrosion resistance of many substrates has proven to be greatly enhanced by the use of chromic acid. The last two stages, the recirculated deionized water rinse and the spray virgin deionized water rinse, remove all phosphate residue from the surface so as to not contaminate the electrodeposition primer tank.

The first stage uses a series of spray nozzles or other applicators to spray the metal surface and remove contaminants through impingement and chemical cleaning. A typical cleaning chemical includes a caustic base and surfactant content. A tank having, for example, a 30,000 gallon capacity receives run-off from the spray as well as contaminants that are rinsed from the metallic surface. Oils removed from the surface are removed from the tank and transferred to a treatment process. Solution used in the process is recirculated and re-enters the process through the spray nozzles or other applicators.

The contaminants removed from the spray stage collect inside the tank and deplete the cleaning chemicals. Grinding dust and other solid contaminants are known to collect at the bottom of the tank. To clean the tank, the tank is drained and the contaminants are removed from the bottom of the tank. To maintain an optimum chemical content, cleaning occurs approximately every two weeks. Otherwise, the contaminants collect in the tank and deplete the chemical cleaner.

A further problem results when the contaminants collect in the tank close to the spray nozzle inlet that provide the cleaning solution to the spray nozzles. If these contaminants are not allowed to settle to the floor of the tank, they can be drawn into the spray nozzle inlet. These contaminants are known to plug up the inlet, collect in the spray nozzles, and foul the pumps that pump the solution at a desired impingement pressure from the tank to the spray nozzles.

It is therefore an object of the present invention to provide a system that decreases the collection of contaminants inside the first stage proximate to the nozzle inlet resulting in less frequent cleaning of the tank and spray nozzles and increased efficiency of the cleaning stages of the pretreatment process.

SUMMARY OF THE INVENTION AND ADVANTAGES

The subject invention provides a spray clean stage of a pretreatment system for treating a product surface having contaminants. A tank holds a cleaning solution for cleaning product surfaces. A solution applicator is in fluid communication with the tank to an applicator inlet. The solution applicator is oriented to spray the solution onto the product surface to remove the contaminants from the product surface. A partition at least partially covers the tank to receive run-off of the solution from the product surface being sprayed with the solution. The partition is oriented to direct the run-off of the solution from the product surface into the tank at a location that is spaced from the applicator inlet to distance the contaminants removed from the product surface from the applicator inlet.

Several benefits are derived by directing the contaminants removed from the product surface into the tank at a spaced location from the applicator inlet. For example, because the contaminants are typically more dense than the cleaning solution, the contaminants settle into the solution disposed in the tank. If the contaminants do not settle prior to being drawn into the applicator inlet, the applicators and pumps can become fouled as stated above. Upon directing the contaminants removed from the product surfaces to an area of the tank spaced from the applicator inlet, the contaminants are allowed time to settle in the tank before the solution is drawn into the applicator inlet. This provides the desired result of reducing the amount of maintenance needed to be performed on the applicators and the pumps. Further, contaminants that have settled reducing the probability of being drawn into the applicator inlet will not be applied to subsequent product surfaces by the applicators.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
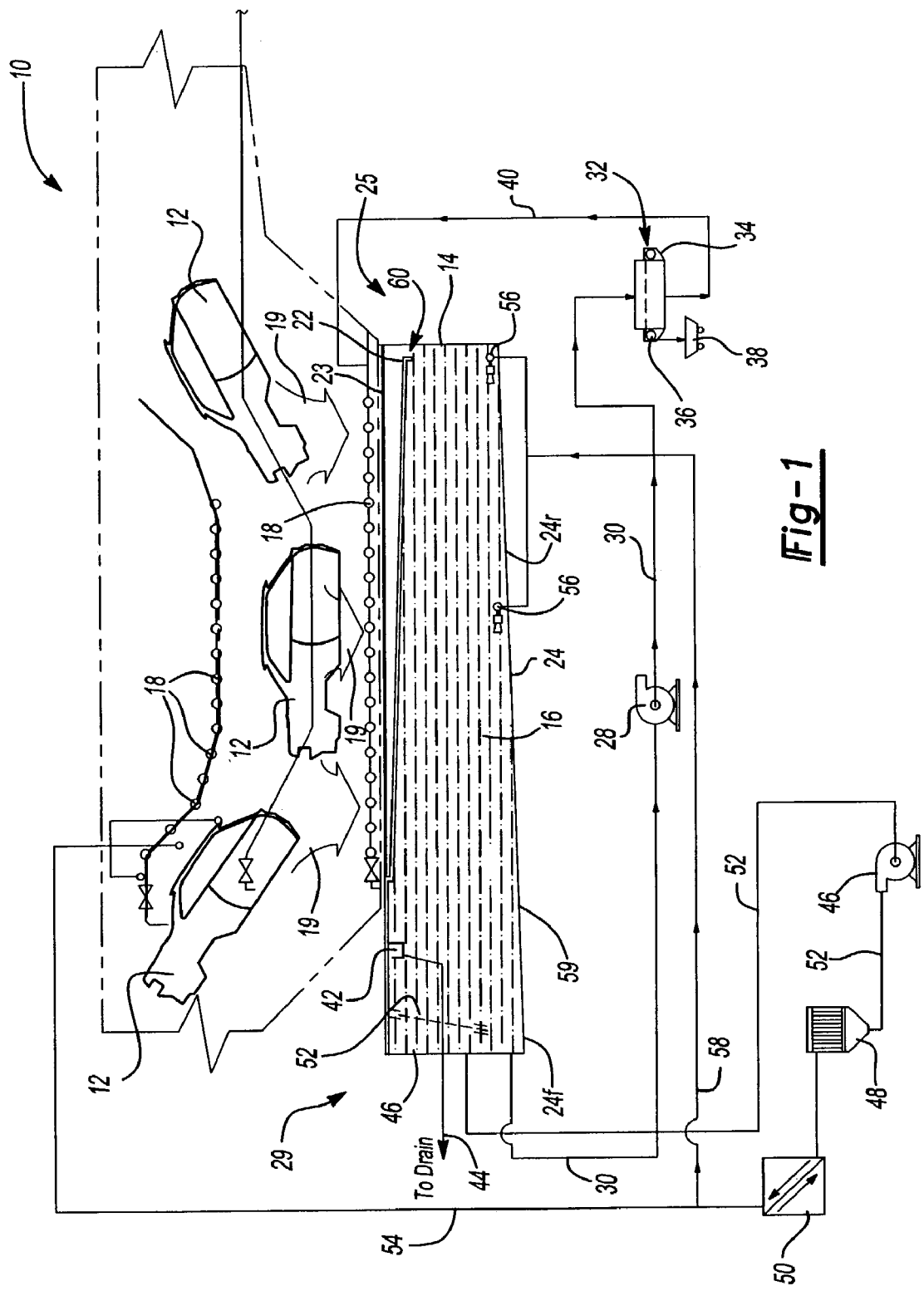
FIG. 1 shows a schematic view of a spray clean stage showing the inventive partition in accordance with the subject invention.

Referring to FIG. 1, an inventive spray clean stage of a pretreatment process is generally shown at 10. The spray stage is the first stage of the pretreatment process and is generally regarded as the sacrificial cleaning stage. The spray stage can be used to clean either metallic substrates or plastic substrates in preparation for providing a conversion coating in the case of a metallic substrate or a primer coating in the case of a plastic. For the purposes of this application, the pretreatment of a metallic substrate will be referred to, but it should be understood that the inventive spray clean stage 10 may be used for either metallic or plastic substrates.

A metal substrate or product surface 12, shown in FIG. 1 as a vehicle body, is moved through the spray clean stage 10 suspended over a tank 14 via a conveyor system (not shown). The tank 14 holds a cleaning solution 16 that is applied to the product surface 12 under pressure through solution applicators 18, such as, for example, spray nozzles or water jets. The cleaning solution 16 is maintained within a narrow pH and temperature range known to optimize the chemical cleaning of the product surface 12. Therefore, the product surface 12 is cleaned by both impingement and by chemical dissolution of contaminants disposed upon the product surface 12.

The solution applicators 18 are in fluid communication with the tank 14 through an applicator inlet 52 as will be explained further below. The applicators 18 are oriented to spray the solution 16 onto the product surface to remove the contaminants. The solution 16 runs off the metal substrate 12 as indicated by narrows 19 carrying with it various particulate waste materials and contaminants as described above.

A partition 22 at least partially covers the tank 14 and receives run-off of the solution 16 as indicated by arrows 19 from the product surface 12 being sprayed with the solution 16. The partition 22 is oriented to direct the run-off of the solution 16 from the product surface 12 into the tank 14 at a location spaced from the applicator inlet 52 to distance the contaminants being removed from the product surface 12 from the applicator inlet 52. Therefore, the contaminants removed from the product surface 12 can settle in the tank 14 at a location distanced from the applicator inlet 52 reducing the probability that the contaminants can be drawn into the applicator inlet 52 plugging the applicators 18 or being reapplied to the product surface 12.

The tank 14 includes a floor 24 upon which the contaminants can settle. The floor includes a first level 24f positioned generally adjacent the applicator inlet 52 and a second level 24r positioned generally beneath the location spaced from the applicator inlet 52. Preferably, the first level 24f includes a height less than the second level 24r the purpose of which will become more evident as described below. Preferably, the tank 14 includes a rearward end 25 and a forward end 29. The applicator inlet 52 is disposed in the forward end 29 of the tank 14. The location spaced from the applicator inlet 52 is preferably located near the rearward end 25 of the tank 14. However, this configuration may be reversed if desired.

A first pump 28 continuously pumps the solution 16 and contaminants through a filtration line 30 located adjacent the first level 24f of the floor 24. The filtration line 30 carries the solution 16 and contaminants toward a vacuum filter generally indicated at 32. While a vacuum filter 32 is preferable, other filters as known to those of skill in the art may also be used. The vacuum filter 32 includes media paper 34 on a roller 36 and a pressure sensor (not shown). As the mixture of solution 16 and contaminants pass through the media paper 34, the contaminants are filtered from the solution 16 as is known to those of skill in the art. When a critical amount of contaminants 20 are built up on the media paper 34, a vacuum is established below the paper 34 and the pressure sensor triggers movement of the exposed media paper 34 into a collection bin 38 by rolling new media paper 34 into place. Other types of filters and indexing apparatus may be used to filter the solution 16 as would be appreciated by those of skill in the art. Filtered solution 16 is returned the tank 14 from the vacuum filter 32 via solution return line 40.

A weir 42 is optionally disposed in the tank 14 to allow metal forming oil or other lubricants that collect on top of the solution 16 to drain. A drain line 44 is fluidly connected to the weir 42 to allow the oils or other floating contaminants to drain from the tank. When the circulation pumps are running and solution 16 is distributed throughout the spray lines and headers of the tank 14, the solution 16 level is preferably below the weir 42 and does not spill into the weir drain line 44 from the tank 14. When the circulation pumps are off, the spray lines and headers drain into the tank 14 raising the solution level above the weir 42 allowing the upper level of the solution, which is where oil typically collects, to drain. However, it may be desirable to balance the solution 16 level to flow continuously into the weir drain line 44 during production.

A second pump 46 draws the solution 16 through the applicator inlet 52 and pumps the solution 16 through a filter 48 and subsequently through a heat exchanger 50 to maintain the solution at an optimum temperature. The filtered solution 16 is then transferred to the applicators 18 under pressure through feed line 54 or to circulation nozzles 56 disposed beneath the solution 16 in the tank 14 via return line 58. Prior to production, the solution 16 is circulated only through the circulation nozzles 56 to filter and heat the solution 16. During production, the solution 16 is circulated preferably through the applicators 18 and not through the circulation nozzles 56 so that the contaminants removed from the product surface 12 can settle upon the floor 24 of the tank 14.

The tank 14 and the partition 22 define an opening 60 spaced from the applicator inlet 52 providing an ingress for run-off of the solution 16 from the product surface 12 to return to the tank 14. Preferably, the opening 60 is positioned at an opposite end of the tank 14 from the applicator inlet 52.

The partition 22 slopes downwardly toward the opening 60 defined by the partition 22 and the tank 14 to facilitate the flow of solution 16 through the opening 60 and into the tank 14.

Figure 3:
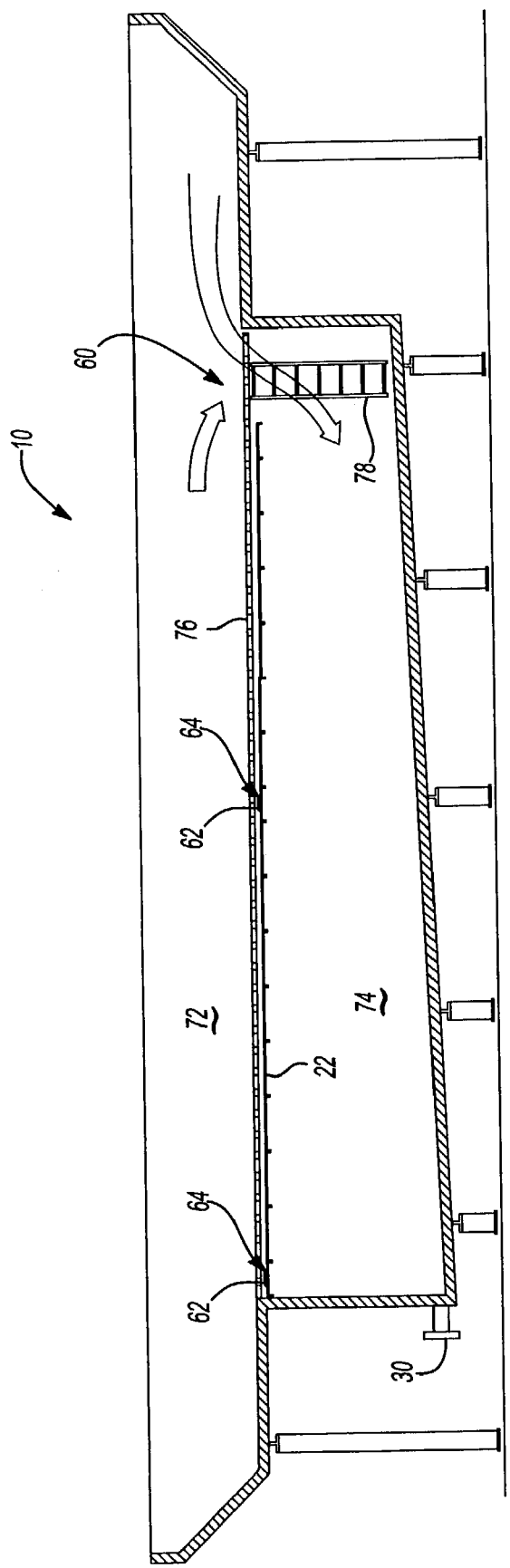
FIG. 3 shows a side sectional view of the inventive spray clean stage.
Figure 4:
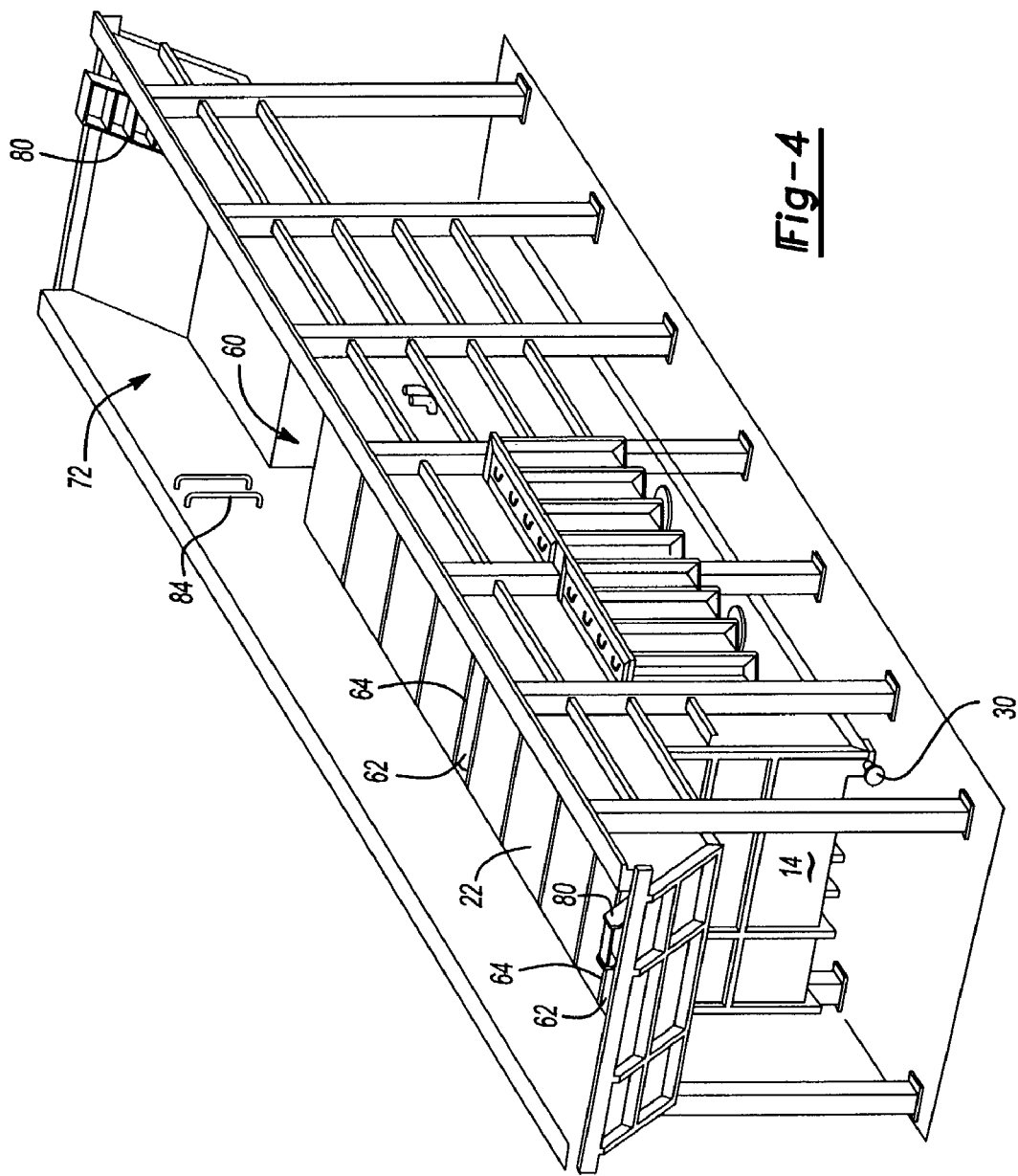
FIG. 4 shows a perspective view of the inventive spray clean stage.

The partition 22 preferably defines at least one access 62 as is best represented in FIGS. 3 and 4. The access 62 is covered by a lid 64 during production to prevent the run-off of the solution 16 from entering the tank 14 at an undesirable location. During maintenance, the lids 64 are easily removed to provide an access for maintenance equipment required to clean the tank 14.

Figure 2:
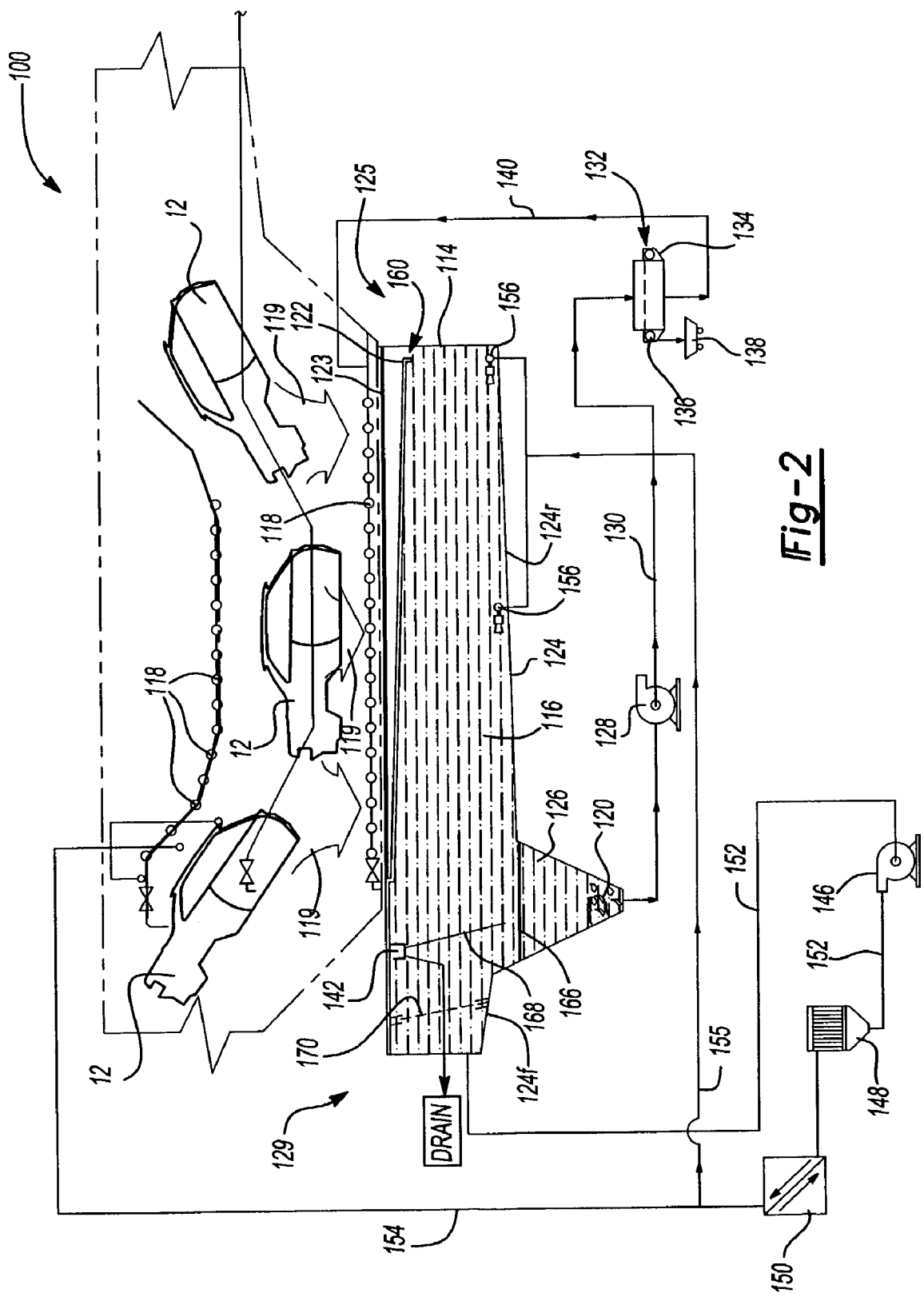
FIG. 2 shows an alternate embodiment of the inventive spray clean stage.

The opening 60 is sized to receive the run-off of solution 16 without causing the solution 16 to puddle above the tank 14. As stated above, the solution 16 drains from the vehicle body in the direction of arrows 19 and subsequently through the opening 60 and into the tank 14. During production, the solid contaminants will settle on the rear floor 27 near the first level 27r of the tank 14. The floor 27 angles downwardly from the opening toward the filtration line 30 located adjacent the first level 24f of the floor 24. An alternate embodiment of the inventive spray clean stage is generally shown at 100 of FIG. 2. Like elements to the first embodiment are represented in a hundred series of numerals to the elements in the first embodiment. A hopper 126 extends downwardly from the floor 124 of the tank 114. The hopper 126 is preferably located generally closer to the first level 124f than to the second level 124r. Both the first level 124f and the second level 124r slope downwardly toward the hopper 126. In this embodiment, the first level 124f is preferably positioned above the second level 124r. Contaminants represented by 120 in FIG. 2 settle at the bottom of the hopper 126 and are pulled by first pump 128 from the tank 114 for filtration as described in the first embodiment. A hopper grating 166 covers the hopper 126 to prevent large contaminants such as, for example, gloves or garbage from fouling the filtration line 130.

A baffle 168 extends downwardly above the hopper 126 to direct contaminants 120 suspended in the solution 116 into the hopper 126. A screen 170 shields the applicator inlet 152 from any large contaminants that may be drawn into the applicator inlet 152 by the second pump 146. The baffle 168 is positioned generally between the screen 170 and the opening 160 defined by the partition 122 and the tank 114. The forward floor 124f is positioned above the level of the rearward floor 124r to further prevent the contaminants 120 from reaching the screen 170.

FIG. 3 shows the inventive spray clean stage 10 having a first section 72 separated from a second section 74 by the partition 22. The first section 72 is generally larger than the second section 74 and funnels run-off of the solution 16 through the opening 60 defined by the partition 22 and the tank 14. A grating 76 provides a support floor above the partition 22 to support loads such as, for example, maintenance workers, above the partition 22. As should be appreciated by those of skill in the art, the solution 16 flows freely through the grating 76 onto the partition 22 and through the opening 60. A ladder 78 provides access for maintenance workers to climb into the second section 74 to perform maintenance.

FIG. 4 shows a perspective view of the inventive spray clean stage 10 without the grating 76. As represented, an axis 62 is positioned generally above the applicator inlet 52. First stage ladders 80 are optionally included to provide access for maintenance workers to enter the first stage 72. Support handles 84 may also be affixed to a wall of the first section 72 above the opening 60 to support a maintenance worker descending into the second section 74.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A spray clean stage of a pretreatment system for treating a product surface having contaminants, comprising:
   a tank for holding a cleaning solution for cleaning the product surface;
   a solution applicator in fluid communication with said tank through an applicator inlet, said solution applicator being oriented to spray the solution onto the product surface thereby removing the contaminants from the product surface;
   a partition at least partially covering said tank, thereby receiving runoff of the solution from the product surface being sprayed with the solution and defining at least one access therethrough, said partition oriented to direct the runoff of the solution from the product surface into said tank at a location spaced from said applicator inlet thereby distancing the contaminants removed from the product surface from said applicator inlet; and
   a cover removably sealing each said access thereby limiting solution from entering said tank through said access.

2. A spray clean stage as set forth in claim 1, wherein said tank and said partition define an opening spaced from said applicator inlet providing an ingress for runoff of the solution to return to said tank.

3. A spray clean stage as set forth in claim 2, wherein said partition slopes downwardly towards said opening defined by said partition and said tank.

4. A spray clean stage as set forth in claim 3, wherein said access is positioned generally above said applicator inlet.

5. A spray clean stage as set forth in claim 1, including a first section and a second section, said first section separated from said second section by said partition.

6. A spray clean stage as set forth in claim 5, wherein said first section is oriented to direct runoff of the solution into said opening defined by said partition and said tank.

7. A spray clean tank as set forth in claim 1, wherein said tank includes a floor having a first level generally adjacent said applicator inlet and a second level positioned generally beneath said location spaced from said applicator inlet, said first level having a height less than said second level.

8. A spray clean tank as set forth in claim 7, including a collector disposed in said floor to receive contaminants removed from the product surface.

9. A spray clean stage as set forth in claim 8, wherein said first level and said second level angle downwardly toward said collector.

10. A spray clean stage as set forth in claim 9, wherein said collector is positioned between said spaced location and said nozzle inlet.

* * * * *